June 5, 1928.  1,672,586
J. T. TRAVERS
PROCESS FOR PURIFYING TANNERY WASTE
Filed Aug. 2, 1927  2 Sheets-Sheet 1
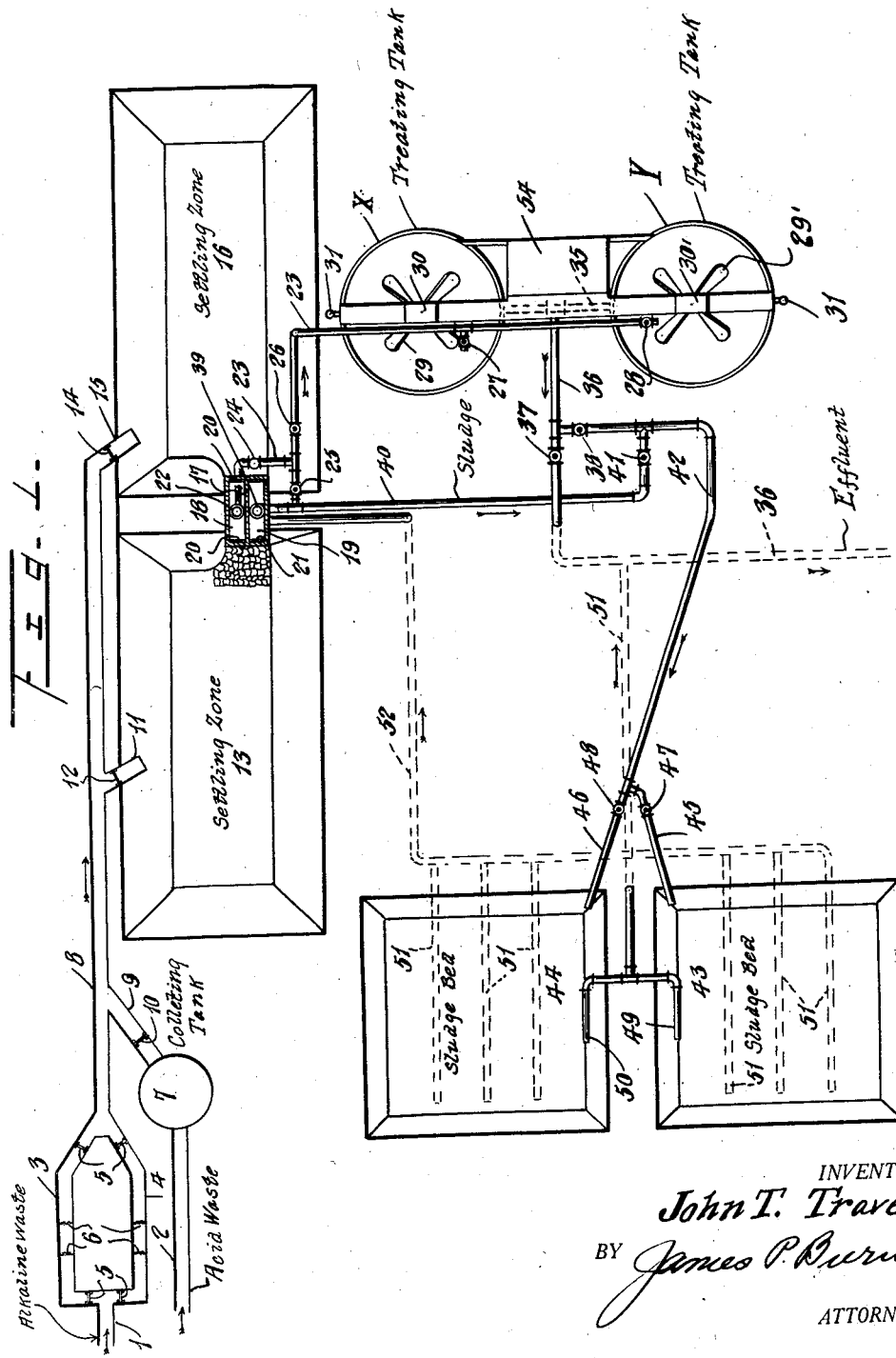
INVENTOR.
John T. Travers,
BY James P. Burns
ATTORNEY.

June 5, 1928. 1,672,586
J. T. TRAVERS
PROCESS FOR PURIFYING TANNERY WASTE
Filed Aug. 2, 1927 2 Sheets-Sheet 2
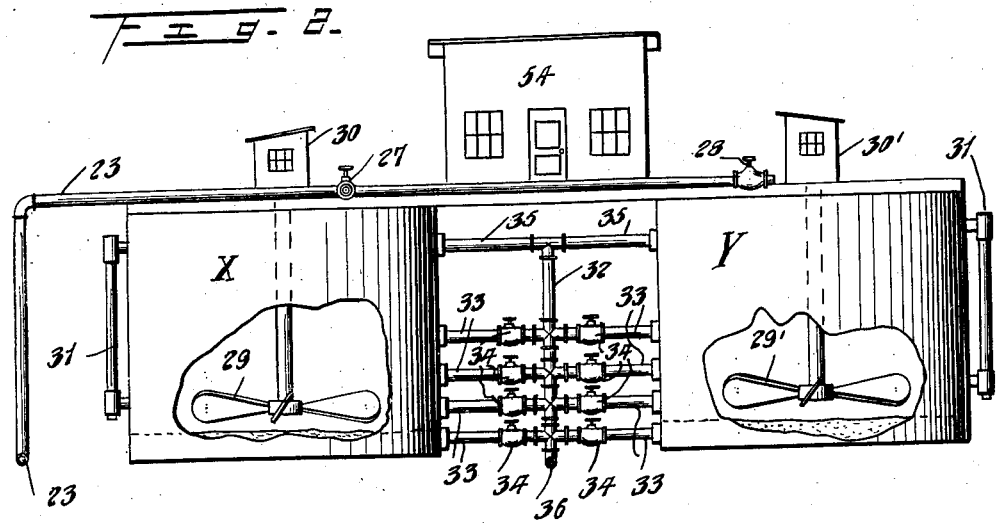
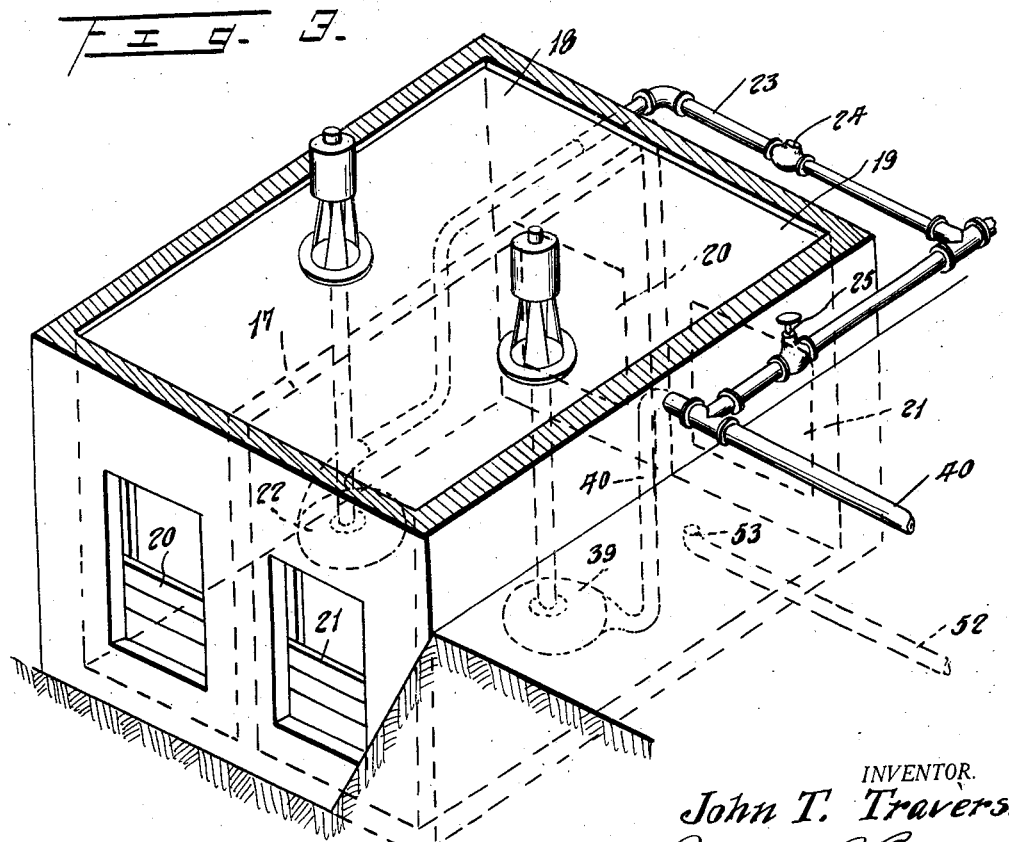
INVENTOR.
John T. Travers.
BY James P. Burns
ATTORNEY.

Patented June 5, 1928.

1,672,586

UNITED STATES PATENT OFFICE.

JOHN T. TRAVERS, OF COLUMBUS, OHIO.

PROCESS FOR PURIFYING TANNERY WASTE.

Application filed August 2, 1927. Serial No. 210,208.

This invention relates to a process for purifying waste liquids discharged from tanneries which are normally dangerous wastes of a highly polluted character.

To the end that the invention may be better understood, it is thought advisable to give some consideration to the specific characteristics of tannery waste.

The process of tanning, generally stated, comprises three main steps: First, the rehydration of the partially dried hides. This is done by soaking the hides in water or in a weak solution of acid or alkali. This operation removes dirt and soluble proteins such as blood, lymph, etc., as well as salt used in curing. These constituents go into the soaking solution. Second, the hair is removed from the hides by the action of suitable alkalies or alkali sulphides. Usually lime is used for this purpose. Ordinarily a saturated solution of lime water is employed which is about 13% calcium hydroxide. Third, the precipitation of the hide substances by the action of tannin or the hydroxides of heavy metals such as iron, aluminum and chromium. The solutions for tanning are usually infusions of water made from the bark of certain trees and contain much organic matter in addition to the tannin such as resinous substances.

The waste liquors which issue from a tannery are made up of the soaking solutions, the spent lime solutions, the de-liming solutions and part of the tanning solution as well as the various rinses used. These liquors, it will be noted, contain tannin, the salts of tannic acid, lime and the lime salts of organic acids, vegetable proteins, animal proteins. salt used in curing the hides, and other organic matter in large quantities and of variable compositions.

In the conventional operations of tanneries, the waste liquors produced are divided into two distinct classes, namely, the lime or alkaline waste, and the acid waste. The alkaline waste comes from the alkali treatment vats, soaking and hot water vats, unhairing machines, wash wheels, cold pools, hair washers, cooling coils, and the like, and generally constitutes substantially 85% of the total waste liquor discharged from the tannery. This alkali waste is discharged from the tannery in more or less uniform quantities throughout the working day. The acid waste which represents about 15% of the total liquid waste from the tannery comes from the tanning treatment vats and is composed of vegetable tan liquors, acid and soda bleach liquor and acid bleach liquor. The acid waste is irregularly discharged from the tannery, usually the bulk of this waste being discharged in the late afternoon of the working day.

Heretofore tannery waste has been treated in the following manner: The lime treatment or alkaline waste is discharged to one settling zone where it assumes a quiescent state and is maintained for a period of substantially twelve hours. A settling of substantially 10% of the suspended matter is thus effected. The acid waste is discharged into a separate settling zone and a slight precipitation of suspended matter takes place.

Such treatment does not remove any of the putrescible matter present in the waste in colloidal form and only separates a small portion of the putrescible matter held in suspension in the waste.

My process is predicated upon the discovery that a very substantial part of the putrescible matter in tannery waste is present in colloidal form and my process, therefore, contemplates the removal of colloids as well as suspensoids from the waste.

The purification of this waste necessitates the removal of organic matter which is subject to putrefaction and also tannin which causes discoloration of the water in a stream into which the waste is discharged. Tannin, it will be appreciated, is a compound of carbon, hydrogen and oxygen and will form a colloidal combination with iron, the combination being blue-black in color. This phenomenon causes the discoloration of the water in any stream having even a small iron content.

The organic content of the waste is composed of the animal and vegetable proteins and a large amount of organic matter which does not contain nitrogen. The animal proteins are dissolved by the different solutions from the hides used in tanning. They are colloidal in nature and carry a positive charge in an acid solution and a negative charge in an alkaline solution. This phenomenon is due to the adsorption of H ions in the one case and the OH ions in the other case. Proteins are combinations of amino acids. These proteins are aggregates of molecules or ions or both and have a high molecular weight. They are highly putrescible. The same is true of the vegetable proteins. The source of the vegetable proteins is the vegetable extracts used for tanning purposes. These proteins are also colloidal in nature and act in a manner similar to that of the animal proteins. These proteins along with the nitrogen-free organic matter are the substances which are responsible for the putrefaction which takes place in the streams receiving tannery waste. They produce a condition resulting in a deficiency of oxygen in the stream. The resultant condition is favorable for the growth of anarobic bacteria with the formation of foul odors so noticeable with the multiplication of this bateria. The amount of putrefaction will be in proportion to the waste flow and the stream flow. A sufficient deficiency in the oxygen content of a stream will destroy all aquatic life.

My process is capable of removing the greater part of this organic matter, animal and vegetable proteins and the tannin and will produce a satisfactory effluent which causes no pollution in the receiving stream.

In its specific aspect, the invention contemplates the uniting in predetermined proportions, of the constituent of the waste having an alkaline reaction and the constituent of the waste having an acid reaction and the delivery of the united waste constituents to a common settling zone wherein a very substantial precipitation is effected, the subsequent subjection of the united waste liquors to a treatment adapted to effect substantially complete clarification and purification thereof.

The operation of my process will be described in connection with the apparatus diagrammatically illustrated in the accompanying drawings wherein:

Figure 1 is a plan view of an apparatus suitable for carrying out the process described;

Fig. 2 is a side elevational view with parts in section, taken on the line 2—2 of Figure 1;

Fig. 3 is a detail perspective view of a portion of the apparatus.

In the drawings separate sewers or conduits 1 and 2 are shown for the alkaline and acid wastes respectively. The conduit 1 has duplicate parallel branches 3 and 4, each provided with a pair of valves or gates 5 and a pair of screening elements 6. The arrangement is such that the branches 3 and 4 may be alternately employed so that the screening elements in one branch may be cleaned and the screenable solids recovered while the alkaline waste is continuously passing through the alternate branch. The solids which are separated from the liquor by the screening elements 6 constitute a by-product of the tanning treatment. Since the acid waste is irregularly discharged from the tannery and since it is essential in my process to maintain the alkaline and acid wastes in predetermined proportions, I provide a collecting tank 7 for the acid waste to at all times insure an available supply of this waste constituent. The screened alkaline waste liquor flows from either the branch 3 or 4 through the common conduit 8. At a suitable point in the conduit 8, regulated quantities of the acid waste constituent from the tank 7 are introduced to the alkaline constituent through the conduit or sewer 9 controlled by the valve or gate 10. From the conduit 8 the commingled regulated quantities of the acid and alkaline waste constituents are delivered either through the branch 11 controlled by the valve or gate 12 to the settling zone or pond 13 or through the branch 14 controlled by the valve or gate 15 to the alternate settling zone or pond 16. The arrangement of the alternate settling zones 13 and 16 is such that the waste may be discharged into one zone while the waste in the other is in a quiescent state and during the removal thereof. By suitably regulating the proportions of the acid and alkaline constituents in the waste introduced to the settling zones 13 and 16, a very substantial precipitation of suspended matter is effected. The proper combination of these two waste constituents to effect precipitation of suspended matter therefrom is, in so far as I am aware, new and constitutes an important feature of my invention. I prefer to combine the constituents having alkaline and acid reactions in substantially the proportions in which they are produced, i. e., 85% alkaline waste and 15% acid waste. By keeping this ratio between the two constituents of the mixture introduced to the settling zones 13 and 16, precipitation of as much as 50% of the suspended matter may be effected without the use of other ingredients. I attribute this increase in precipitation to the reaction between the acid of one constituent and the calcium hydroxide of the other.

As hereinbefore stated, the colloidal constituents of tannery waste are highly putrescible and must be removed. These colloids are negatively charged in an alkaline solution and may be removed by the addition to the solution of an electrolyte producing material capable of dissociating and supplying an excess of positive ions which are adsorbed by the negative colloids, neutralizing their charges and transforming them from colloids into suspensoids.

The colloids are not completely separated from the tannery waste in settling zones 13 and 16, since the quantity of sulphuric acid present in the waste is insufficient to produce an excess of the electrolyte in its reaction with the calcium hydroxide. To effect the complete clarification and purification of the waste, the liquor from which a substantial quantity of the suspended matter has been precipitated is removed from the settling zones 13 and 16 and subjected to further treatment. To effect the removal of the still polluted liquor from the zones 13 and 16, I provide a pump well or house 17 positioned intermediate the zones 13 and 16. The pump well 17 has two compartments, a water compartment 18 and a sludge compartment 19, each of which communicates with either settling zone 13 or 16. The compartment 18 has the sluice gates 20 for selectively placing that compartment in communication with the settling zones while the compartment 19 is provided with similar sluice gates 21 (shown in detail in Figure 3). From the compartment 18, the water is forced by a suitable pump 22 through the line 23 and check valve 24 to either of the alternate treating tanks X and Y, the valve 25 being closed and the valve 26 open. When it is desired to deliver the water to the tank X, the valve 27 is opened and the valve 28 closed, and when the polluted water is to be delivered to tank Y, the valve 27 is closed and the valve 28 opened.

The polluted water is alternately passed to the tanks X and Y and while only two of these tanks are here shown, it is to be understood that any desired number may be employed and used in suitable rotation or in parallel. When a predetermined volume of liquid has been introduced to tank X, the continuous flow of water through line 23 is diverted to tank Y by closing valve 27 and opening valve 28. There is then introduced to the liquid in tank X a suitable quantity of a treating mixture containing an electrolyte producing material, a coagulant and, if the water is neutral or slightly acid in character, an alkali may be incorporated in the mixture to assure the effecting of an alkaline reaction in the liquid. The liquid is agitated by the agitator 29 driven by a suitable motor in the hopper house 30 positioned above the tank X within which the treating mixture may be introduced to the liquid in tank X. The tank Y is also equipped with an agitator 29′ and a hopper house 30′. The agitation is continued for only a short period. I find that a period of from 3 to 7 minutes proves satisfactory. The agitation is then ceased and the liquid permitted to assume a quiescent state to permit precipitation of the suspensoids which have been formed by the transformation of colloids into suspensoids as well as to permit settling of other matter held in suspension in the liquid and coagulated by the introduction of the coagulant.

A short period of precipitation is sufficient to effect the clarification of the liquid. Substantially complete clarification is effected in a period of substantially thirty minutes. The clarification in the tanks X and Y may be observed by noting the liquid in the liquid level gauges 31. Each of the tanks X and Y communicates with a common header 32 through a plurality of vertically disposed draw-off lines 33 in each of which is interposed a valve 34. The purpose of these draw-off lines 33 is to permit the clarified effluent to be gradually removed from the treating tanks from the top toward the bottom thereof. It will be understood that the upper strata or layer of the effluent is the first to be clarified. This layer may be drawn off through the upper draw-off line while settling is still occurring in the lower portion of the tank. The lower draw-off line from each tank X and Y is employed for the removal of sludge from the tanks in a manner to be presently described.

An overflow line 35 connects each tank with the header 32 at a point at which it is desired to maintain the liquid level in the tank. Suitable electrolyte producing materials for use in my process are calcium sulphate, magnesium sulphate, the waste dusts collected from the precipitators in the manufacture of cement and the solid waste recovered from the waste solutions discharged from an alkali plant in the manufacture of chlorine, chloride of lime and caustic soda. Suitable coagulants are ferrous sulphate, aluminum sulphate and calcium monophosphate. When an alkali is necessary, it is supplied in the form of hydrated lime. The quantities of the mixture necessary and the proportions of the various ingredients will vary somewhat depending upon the specific character of the waste under treatment. The quantity of lime used will depend on the acidity of the liquid. The ingredients composing the treating mixture may, for example, be advantageously combined in substantially the following proportions: electrolyte producing material 85%, lime 10% and coagulant 5%. These proportions, of course, may be varied. However, I find it preferable to keep the electrolyte producing material present in the mixture in an amount equal to at least 50% of the mixture. The quantity of the treating mixture may, for example, vary from 3 to 18 pounds per 1000 gallons of liquid treated, the proper quantity for treatment of a given polluted waste being ascertained by trial tests and noting the clarification of the liquid, the size of the floc, and the rapidity of precipitation.

The clarified effluent discharged from tanks X and Y to the header 32 passes to the receiving stream through the line 36, the valve 37 being open and the valve 38 closed.

Coming now to a consideration of the sludge produced in the process, periodically, as for example, every few weeks, the sludge which has accumulated in the settling zones 13 and 16 is passed to the pump well compartment 19. From compartment 19 the sludge is forced by the sludge pump 39 through the sludge line 40, valve 41, combined sludge line 42, and alternately discharged into sludge dewatering beds 43 and 44 by branch sludge lines 45 and 46 having valves 47 and 48. Should the sludge lines 40 and 42 for any reason become clogged, they may be flushed out by water forced through the water pump 22. This is accomplished by closing the valve 26 in the water line 23 and opening the valve 25.

When it is desired to remove sludge from either of the treating tanks X and Y, all communications between said tanks and header 32 are closed except the bottom draw-off line 33 communicating with the tank from which the sludge is to be removed. The sludge may then be delivered to the dewatering beds 43 and 44 by closing the valve 38, the sludge passing through the line 42 and selectively through branch lines 45 and 46. Should the sludge fail for any reason to flow from the tanks X and Y it may be forced from said tanks by placing a hydrostatic head pressure thereon. This may be accomplished by either admitting liquid to the tank from which sludge is being removed or by opening one of the connecting lines 33 communicating with the alternate tank whereby liquid from the alternate tank is forced under hydrostatic head pressure into the header 32 and flushes out the sludge line, carrying the sludge with it to the dewatering beds 43 and 44.

Clarified water which accumulates above the sludge in the dewatering beds 43 and 44 passes via top drain branch lines 49 and 50 and line 51 to the effluent discharge line 36 and flows therethrough to the receiving stream. The sludge beds 43 and 44 may be of more or less conventional construction, each being provided with a plurality of under drain lines 51, all of which communicate with the under drain line 52. The under drain liquor which is usually discolored and incompletely clarified, passes through line 52 to sludge compartment 19 of pump well 17, being admitted thereto at 53. (See Figure 3.) This under drain liquor may accumulate in compartment 19 and be thence passed by sludge pump 39 to either of the treating tanks X and Y for treatment. This is accomplished by closing valve 41 in sludge line 40 and opening valve 25. The treating mixture employed in the process may be advantageously stored in the storage house 54 located on a level with the upper ends of treating tanks X and Y.

The electrolyte producing material employed in my process is of a relatively slowly soluble character. For this reason a substantial portion of the electrolyte producing material precipitates and collects with the sludge in the bottom of the tanks X and Y. To obtain maximum benefits from the treating mixture, the blades of the agitators 29 and 29' are so set that the agitators effect an upward circulation in the tanks and during the agitating period they lift portions of previously precipitated sludge and undissolved electrolyte producing material and redistribute the same through each subsequently treated batch of liquid, thus effecting a material saving in the quantity of treating mixture employed.

As illustrating the operation of my process, the alkaline and acid constituents of a tannery waste were combined in substantially the proportions of 85 parts alkaline waste and 15 parts acid waste, the commingled wastes showed upon analysis:—

| | | |
|---|---|---|
| Total solids | 8572 | P.P.M. |
| Suspended matter | 2444 | P.P.M. |
| Organic suspended matter | 2174 | P.P.M. |
| Organic matter not in suspension | 3111 | P.P.M. |
| Total organic matter | 5285 | P.P.M. |
| Organic nitrogen as N | 101.9 | P.P.M. |
| Organic nitrogen as protein | 636.9 | P.P.M. |
| Tannin | 844 | P.P.M. |
| 24 hour biochemical oxygen demand | 680 | |
| 48 hour biochemical oxygen demand | 1160 | |
| 10 day biochemical oxygen demand | 3400 | |

The commingled substances were permitted to settle for six hours. The settled waste shows upon analysis:—

| | | |
|---|---|---|
| Total solids | 5068 | P.P.M. |
| Suspended matter | 415 | P.P.M. |
| Organic suspended matter | 328 | P.P.M. |
| Organic matter not in suspension | 1746 | P.P.M. |
| Total organic matter | 2074 | P.P.M. |
| Organic nitrogen as N | 84.9 | P.P.M. |
| Organic nitrogen as protein | 530.6 | P.P.M. |
| Tannin | 149 | |
| 24 hour biochemical oxygen demand | 410 | |
| 48 hour biochemical oxygen demand | 720 | |
| 10 day biochemical oxygen demand | 1900 | |

The settled waste when treated in the treating tanks with a treating mixture composed of waste dust from precipitators employed in the manufacture of cement, hydrated lime and ferrous sulphate in substantially the proportions of 85% waste dust, 10% lime, and 5% ferrous sulphate yielded an effluent showing upon analysis:—

| | | |
|---|---|---|
| Total solids | 3600 | P.P.M. |
| Suspended matter | 3 | P.P.M. |
| Organic suspended matter | 2 | P.P.M. |
| Organic matter not in suspension | 1250 | P.P.M. |
| Total organic matter | 1252 | P.P.M. |
| Organic nitrogen as N | 6.8 | P.P.M. |
| Organic nitrogen as protein | — | |
| Tannin | 0 | |
| 24 hour biochemical oxygen demand | 21 | |
| 48 hour biochemical oxygen demand | 34 | |
| 10 day biochemical oxygen demand | 180 | |

The reactions which take place when tannery waste is treated in the tanks X and Y in my process are as follows:—

1. If the waste is acid it is neutralized and an alkaline solution is produced by the excess lime. If the waste is neutral it is made alkaline by the lime in the mix.

2. The sign of the colloids are changed from positive in an acid solution to negative in an alkaline solution, preparing them for precipitation by the electrolyte.

3. There is a formation of a positive colloidal ferrous hydroxide which unites with and adsorbs the tannin, the two precipitating together.

4. The negative charges on the colloids are neutralized by the positive ions released from the electrolyte and the positive ferrous hydroxide to the isoelectric point and are consequently precipitated. Maximum coagulation takes place at this point.

5. The suspended matter is carried down by the formation of the flocculent precipitate.

6. The excess of the electrolyte producing material assists in increasing the rate of precipitation and greatly increases the surface presented to which floating particles may adhere and be carried down with the precipitate. It also greatly improves the character of the sludge.

7. The negative ions released from the electrolyte producing material concurrently with the release of the positive ions act on the water solution, effecting a release of nascent oxygen which constitutes a supplemental purifying agent in the treatment and materially assists in the destruction of bacteria as well as supplies a very substantial quantity of dissolved oxygen to the effluent, avoiding the necessity for reaeration of the effluent produced.

8. An easily dewatered sludge is formed. It is granular in structure and does not present the usual difficulties characteristic of sludges.

From the foregoing analysis of the effluent it will be noted that the same is non-putrescible and non-polluting in character. This effluent may be safely discharged into any stream without danger of pollution, discoloration of the water or destruction of aquatic life.

The foregoing description is merely illustrative and it is to be understood that the invention comprehends such changes and modifications as may be necessary to adapt the process to the local conditions existing at any given tannery.

Having thus described my invention, what I claim is:—

1. A process for treating tannery waste comprising uniting constituents of the waste having an acid reaction with constituents of the waste having an alkaline reaction, freeing the waste of suspensoids precipitated as a result of reaction between the alkaline waste constituents and the acid waste constituents, reacting on the waste free from such suspensoids with a reagent capable of precipitating colloidal and finely suspended contents of the waste while effecting a liberation of nascent oxygen, permitting this nascent oxygen to act upon the body of the waste to effect further purification thereof and coagulating the colloidal matter precipitated by said reagent.

2. A process for treating tannery waste comprising removing screenable solids from the waste, collecting constituents of the waste having an acid reaction in a collecting zone, continuously uniting constituents of the waste having an acid reaction with constituents of the waste having an alkaline reaction in substantially the proportions in which such constituents are formed, freeing the waste of suspensoids precipitated as a result of reaction between the alkaline waste constituents and the acid waste constituents, reacting on the waste free from such suspensoids with a reagent capable of transforming the colloids present in the waste into suspensoids while concurrently effecting the liberation of nascent oxygen, permitting the nascent oxygen to act upon the body of the waste, effecting a further purification thereof, and supplying a dissolved oxygen content thereto.

JOHN T. TRAVERS.